(12) United States Patent
Nakamura

(10) Patent No.: US 6,333,573 B1
(45) Date of Patent: Dec. 25, 2001

(54) ROTARY ELECTRIC MACHINE HAVING RESIN COVERED JOINED PORTIONS

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/613,453

(22) Filed: Jul. 10, 2000

(30) Foreign Application Priority Data

Jul. 12, 1999 (JP) .................................................. 11-197367
Mar. 22, 2000 (JP) .................................................. 12-080902

(51) Int. Cl.$^7$ .................................................. H02K 15/12
(52) U.S. Cl. .............................. 310/45; 310/201; 29/596
(58) Field of Search ............................ 310/45, 179, 260, 310/201; 442/117; 29/598, 596

(56) References Cited

U.S. PATENT DOCUMENTS

| | | | |
|---|---|---|---|
| 4,335,179 | * | 6/1982 | Mendelsohn et al. ................ 442/117 |
| 4,588,916 | * | 5/1986 | Lis ........................................ 310/260 |
| 5,093,598 | * | 3/1992 | Fort ...................................... 310/215 |
| 5,097,167 | * | 3/1992 | Kanayama et al. ................... 310/201 |
| 5,789,840 | * | 8/1998 | Gould et al. .......................... 310/179 |
| 5,866,960 | * | 2/1999 | Meier et al. ............................ 310/59 |
| 5,998,903 | | 12/1999 | Umeda et al. ........................ 310/179 |
| 6,121,707 | * | 9/2000 | Bell et al. ............................. 310/179 |
| 6,191,508 | * | 2/2001 | Aoki et al. .............................. 310/45 |
| 6,204,586 | * | 3/2001 | Umeda et al. ........................ 310/179 |
| 6,211,586 | * | 4/2001 | Hediger et al. ......................... 310/52 |

FOREIGN PATENT DOCUMENTS

98/54823 * 3/1998 (WO) .

* cited by examiner

Primary Examiner—Joseph Waks
(74) Attorney, Agent, or Firm—Pillsbury Winthrop LLP

(57) ABSTRACT

A rotary electric machine has a stator winding which forms a coil end group on an axial end of a stator. A plurality of conductors are regularly arranged in a row in the coil end group, and an insulating resin is soaked into there between. The insulating resin forms a number of grooves on a radial outside of the coil end group and forms a smooth surface on a radial inside of the coil end group. Therefore, it is possible to decrease an amount of the insulating 10 resin, to provide a high rigidity to the coil end group and to provide a surface area on the outside to radiate heat.

12 Claims, 4 Drawing Sheets

ROTARY ELECTRIC MACHINE HAVING RESIN COVERED JOINED PORTIONS

CROSS REFERENCE TO RELATED APPLICATION

This application is based on Japanese Patent Application No. Hei 11-197367 filed on Jul. 12, 1999 and No. 2000-80902 filed on Mar. 22, 2000 the contents of which are incorporated herein by reference.

BACKGROUND OF THE INVENTION

1. Field of the Invention

The present invention relates to a rotary electric machine having a plurality of joined portions on a coil end and a resinous material covering the joined portions. For example, the present invention is preferably used for an alternator for a vehicle.

2. Description of Related Art

WO 98/54823 discloses the alternator for the vehicle having a stator winding formed by a plurality of conductor segments. The conductor segments extending from different slots are joined to provide a winding having an improved space factor of the conductor in a slot and a low resistance.

Incidentally, since the alternator for vehicle driven by an engine is directly mounted on the engine by a bracket, the engine vibrates the alternator. Additionally, in an engine-room of the vehicle, there is an electrolytic solution such as a detergent and salt water and a foreign body such as a stone. The alternator is required to withstand the electrolytic solution and the foreign body.

Conventionally, a resinous material is soaked into the winding to maintain insulation. However, a lot of resinous material increases cost and weight. On the other hand, since a lot of resinous material covers a surface of the winding, a surface area for radiating heat is decreased. Further, a lot of resinous material makes it difficult to recycle the material such as a copper wire.

SUMMARY OF THE INVENTION

The present invention addresses these drawbacks by providing an improved arrangement.

It is therefore an object of this invention to provide an improved rotary electric machine.

It is a further object of this invention to decrease an amount of a resinous material provided on a stator winding of the rotary electric machine.

It is another object of this invention to improve insulation of the winding and to permit a heat radiation from the winding.

It is a still further object of this invention to improve an ability of a vibration resistance of the winding and to permit a heat radiation from the winding.

According to a first aspect of the present invention, a ring-shaped first resin member for covering joined portions and a second resin member adhered to bridge between inclined portions in a second group of coil ends. The second resin increases a rigidity of the second group.

According to a second aspect of the present invention, the insulating resin provided on a surface of U-shaped conductor segments is thicker in the second group of the coil ends including joined portions than in the first group of the coil ends including turned portions. An amount of the insulating resin can be decreased and the second group can be reliably protected.

According to a third aspect of the present invention, a first insulating resin covers the joined portions and a second insulating resin covers only the U-shaped conductor segments in the second group. An amount of the second insulating resin can be decreased and the second group can be reliably protected by the first and second insulating resins.

According to a fourth aspect of the present invention, the insulating resin provides an inner surface and an outer surface on the second group of the coil ends. The inner surface is smoother than the outer surface. An amount of the second insulating resin can be decreased and the second group can be reliably protected. Further, the second group can be provided with a sufficient surface area to radiate heat.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

The present invention applied to a rotary electric machine as a preferred embodiment will be explained hereinafter. In the embodiment, the present invention is applied to an alternator for vehicle as a rotary electric machine for vehicle.

Figure 1:
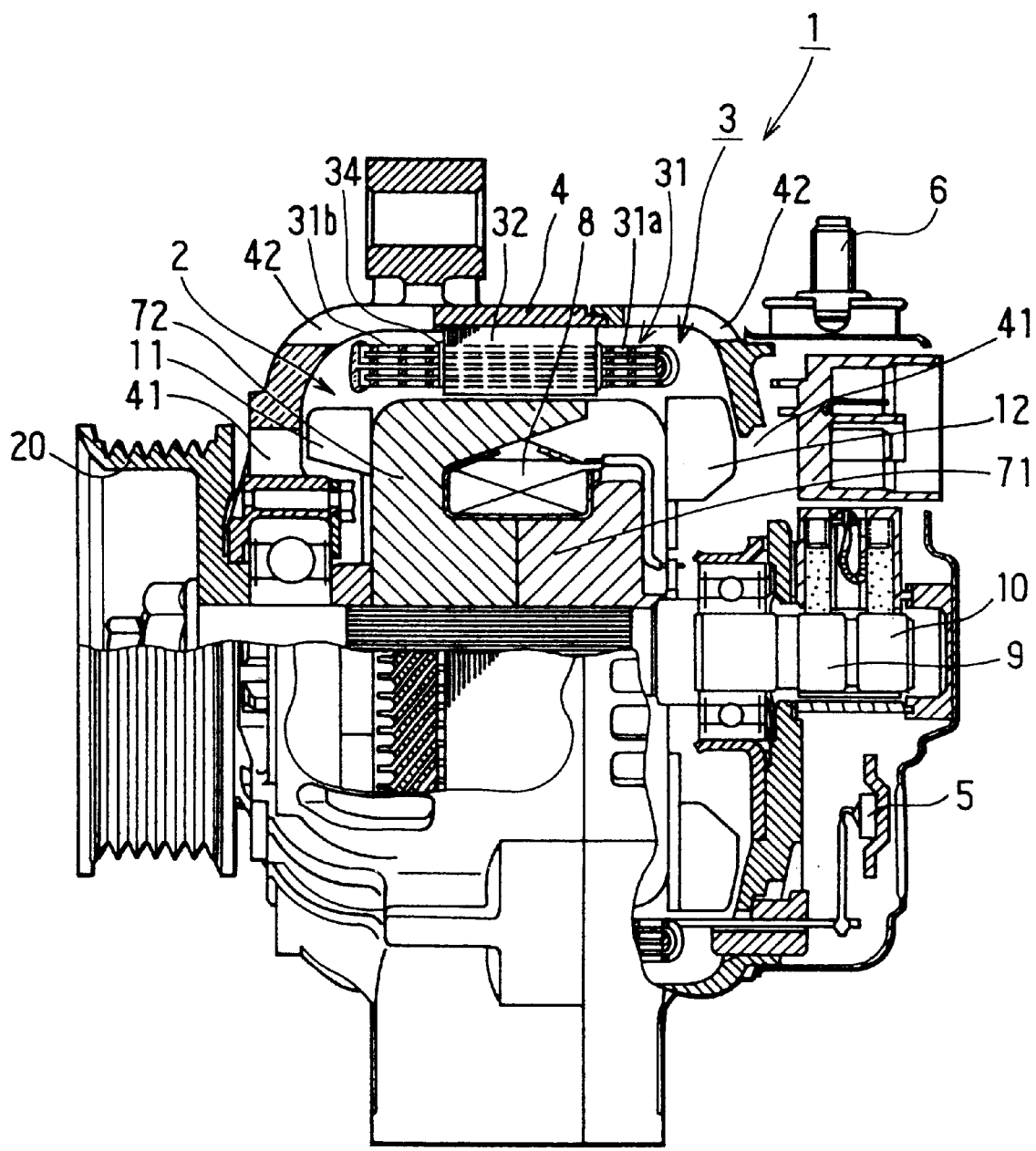
FIG. 1 is a sectional view of an alternator for vehicle according to a first embodiment of the present invention.

Referring to FIG. 1, the alternator 1 has a pulley 20 for receiving a rotating force from an engine. The pulley 20 is fixed on a shaft with a rotor 2. The rotor 2 has a Lundel type iron core formed by a combined pair of pole cores 71 and 72 and a field coil 8. The pole cores 71 and 72 provide a plurality of claw poles as magnetic poles. Cooling fans are fixed on both sides of the rotor 2. In this embodiment, a cooling fan 11 is fixed on a first side on a front side, and a cooling fan 12 is fixed on a second side on a rear side. The cooling fan 11 has blades for sending air in a centrifugal direction and an axial direction. The cooling fan 12 has blades for sending air in a centrifugal direction only. The cooling fan 12 is larger than the cooling fan 11 for cooling an electrical circuit mounted on a frame 4 such as a rectifier 5 and a regulator circuit. Slip rings 9 and 10 are disposed on the shaft. The shaft is rotatably supported on the frame 4.

A stator 3 is located on a radial outside of the rotor 2 and is fixed on the frame 4. The stator 3 has a stator winding 31 and a stator core 32. The stator core 32 is a laminated iron in which a plurality of slots for accommodating the stator winding 31 are formed. Insulators 34 having a sheet shape are respectively disposed in the slots formed on the stator core 32 as grooves. The insulators 34 are disposed along an inner surface of the slots. A copper wire having a flat cross section forms the stator winding 31. The copper wire has a resin layer that covers a surface of the copper wire. Accordingly, in the slots, the copper wire is electrically insulated from the stator core 32 by the resin layer and the insulator 34. The stator winding 31 is formed by arranging a plurality of U-shaped conductor segments 33 in accordance with a predetermined rule and joining ends of the conductor segments 33 electrically in accordance with a predetermined rule. In this embodiment, joined portions of the stator winding 31 are formed by welding.

Figure 2:
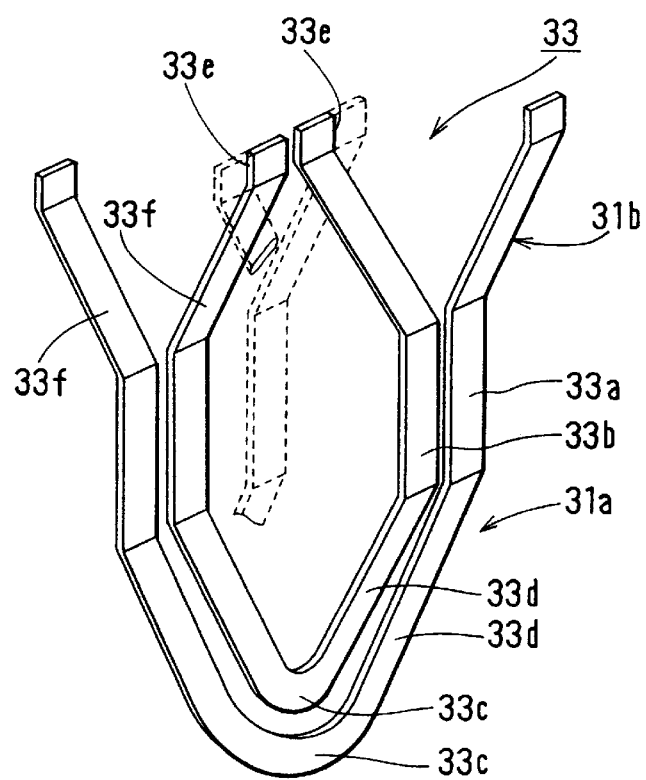
FIG. 2 is a perspective view of a conductor segment forming a stator winding according to the first embodiment of the present invention

As shown in FIG. 2, two U-shaped conductor segments 33a and 33b forms a basic unit. A plurality of the basic units are arranged on the stator core to form a continuous winding around the stator core 32. Each of the U-shaped conductor segments 33 has a turn portion 33c which is formed by bending the copper wire covered with a thin insulating layer and joined portions 33e welded. The turn portion 33c and an inclined portion 33d continuing to the turn portion 33c form a first coil end. A plurality of the turn portions 33c are regularly arranged on a rear side (remote from the pulley) shown in FIG. 1, and form a first group 31a of the coil ends. The joined portion 33e and an inclined portion 33f continuing to the joined portion 33e from a second coil end. A plurality of the joined portions 33e are regularly arranged on a front side (near the pulley) shown in FIG. 1, and form a second group 31b of the coil ends. The inclined portion 33d in the first group 31a has an angle θ1 to an axial direction which is smaller than an angle θ2 of the inclined portion 33f in the second group 31b. As a result, the inclining portions 33d form gaps therebetween which are wider than that of the inclining portions 33f. Therefore, it is possible to suppress an axial height of the second group 31b even it has the joined portions 33e extending in a straight along the axial direction.

In this embodiment, the turn portions 33c almost form the first group 31a. The joined portions 33e almost form the second group 31b. The groups 31a and 31b are formed by arranging the basic units. However, a joined portion may be partially arranged in the first group 31a. For instance, a joined portion for providing a neutral point connection or a joined portion for providing a connection to the rectifier 5 may be arranged. Also, a turn portion may be partially arranged in the second group 31b.

A thinner insulating resin 37 made of the same material as a second insulating resin adheres on the first group 31a. The thinner insulating resin 37 adheres sufficient to cover the conductors in the first group 31a. As a result, passages for a cooling wind communicating between a radial inside and a radial outside of the first group 31a are formed in the first group 31a. The insulating resin 37 covers through out an entirety of the first group 31a and an axial end of the stator core 32. Film-shaped members made of the insulating resin 37 are partially formed between the conductors being adjacent to each other in a radial direction in the first group 31a. Therefore, the insulating resin 37 increases a rigidity of the first group 31a by forming the film-shaped members that work as crossbeams bridging between the conductors. The insulating resin 37 also bridges between the insulator 34 and the conductor segment 33 to bond therebetween at the axial end of the stator core 32.

Figure 3:
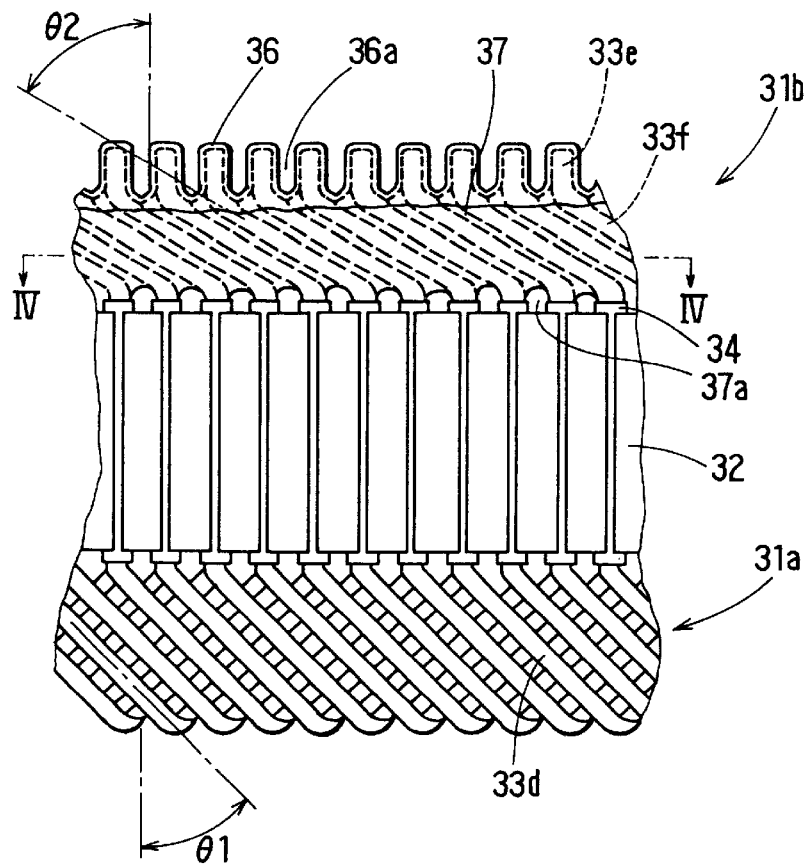
FIG. 3 is a plane view of a part of a stator viewing from an inside of the stator according to the first embodiment of the present invention.

As shown in FIG. 3, an insulating resin 36 is adhered on the joined portions 33e as a first insulating resin. The insulating resin 36 is provided to maintain a separation between adjacent joined portions 33e and to connect an axial tip region of the second group 31b into a ring shape. A viscosity of the insulating resin 36 before hardening and an amount of the insulating resin 36 provided on the second group 31b is adjusted to form radially extending grooves 36a on an axial end of the second group 31b. The grooves 36a contribute to keep a surface area for heat radiation. Either a liquid resin or a powder resin can form the thicker insulating resin 36. In a case of the liquid resin, relatively higher viscosity material is used, and is hardened after adhering on the second group 31b. In a case of the powder resin, the powder resin is hardened after melting the powder resin adhered on the second group 31b.

The insulating resin 37 is adhered on an entirety of the second group 31b as a second insulating resin. Specifically, as shown in FIG. 3, in the second group 31b, the second insulating resin 37 only covers the inclined portion 33f which is the conductor not covered by the first insulating resin 36. The insulating resin 37 forms spaces 37a in the second group 31b at its base portion located near the stator core 32. The first insulating resin 36 is distinctly thicker than the second insulating resin 37.

Figure 4:
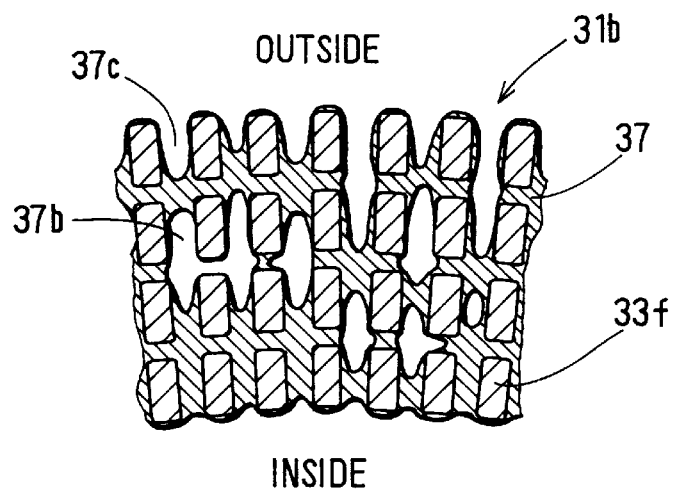
FIG. 4 is a partial sectional view of a coil end according to the first embodiment of the present invention.

As shown in FIG. 4, the insulating resin 37 infiltrates into an inside of the second group 31b and adheres thereon. Specifically, the insulating resin 37 infiltrates into spaces between the inclined portions 33f. In this embodiment, the inclined portions 33f are arranged to form multi-layers in a radial direction and are regularly arranged in a circumferential direction. The insulating resin 37 forms films between the inclined portions 33f and bridges between the inclined portions 33f. The insulating resin 37 infiltrates into almost all of the radial spaces formed between the conductors in the second group 31b. Also, the insulating resin 37 infiltrate into the circumferential spaces formed between the conductors and forms films.

The insulating resin 37 can be formed by adhering a relatively low viscosity material on the second group 31b and hardening it. A viscosity of the insulating resin 37 before hardening and an amount of the insulating resin 37 provided on the second group 31b is adjusted to form bubble like spaces 37b and grooves 37c as shown in FIG. 4. The insulating resin 37 covers through out an entirety of the second group 31b and an axial end of the stator core 32. The insulating resin 37 bridges between the insulator 34 and the conductor segment 33 to bond therebetween at the axial end of the stator core 32.

A plurality of inclined portions 33f form circumferential spaces. The spaces located in the radial inner side are narrower than that located in the radial outer side. Therefore, in the radial inner side of the second group 31b, the insulating resin 37 almost fills the spaces between the inclined portions 33f with respect to the radial direction and the circumferential direction. In the radial outer side of the second group 31b, the insulating resin 37 fills the spaces to remain a plurality of spaces 37b therebetween. Specifically, the inclined portions 33f arranged as the most outer layer are covered with the insulating resin 37, but are still form grooves 37c therebetween.

As a result, the second group 31b provides a wave-shaped outer surface and a cylindrical inner surface. The outer surface area is wider than the inner surface area. The inner surface is smoother than the outer surface. The insulating resin 37 is thicker and more on the second group 31b located on the front side than on the first group 31a located on the rear side.

Figure 5:
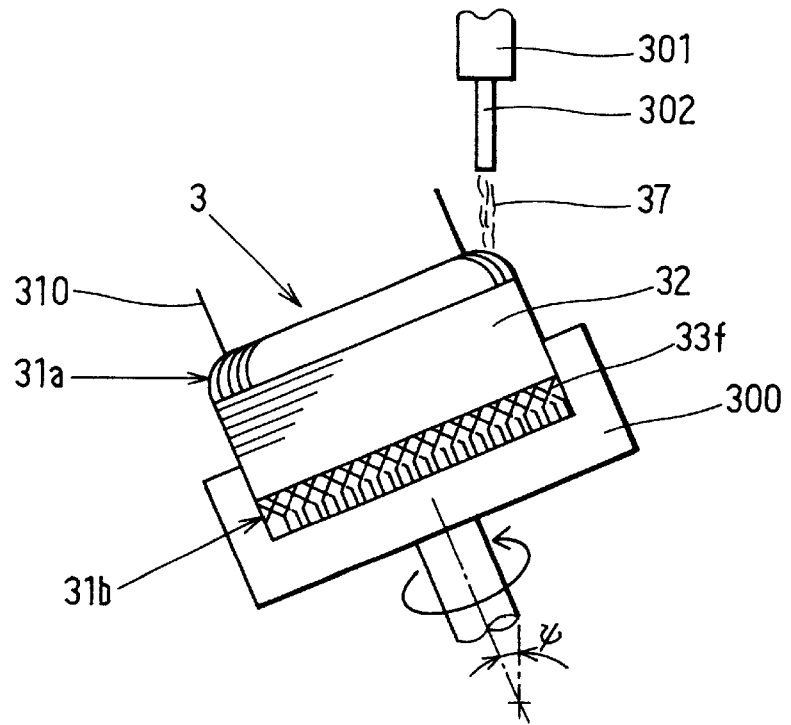
FIG. 5 is a plane view showing a process for providing an insulting resinous material on an inclined portion of the coil end according to the first embodiment of the present invention.
Figure 6:
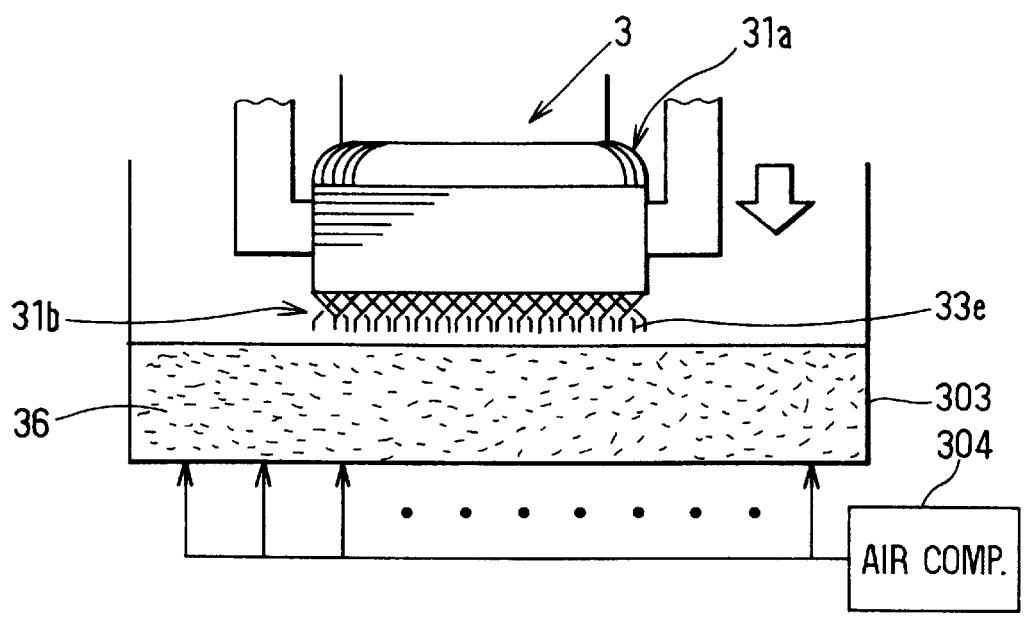
FIG. 6 is a plane view showing a process for providing an insulating resinous material on a joined portion of the coil end according to the first embodiment of the present invention.

A manufacturing process of the above-described embodiment is explained hereinafter with referring to FIG. 5 and FIG. 6. FIG. 5 shows a providing process of the insulating resin 37 to the inclined portions 33d and 33f of the first group 31a and the second group 31b. FIG. 6 shows a providing process of the insulating resin 36 on the joined portions 33e.

Referring to FIG. 5, the stator 3 is supported by a jig 300 which coaxially rotates with the stator core 32 so that the first group 31a is directed upwardly. The stator 3 is tilted at an angle Ψ with respect to the vertical axis. In FIG. 5, the tilt angle is 15 degrees. Therefore, it is prevented to adhere the insulating resin 37 on tips of output leads 310 to be connected to the rectifier 5. The insulating resin 37 is made of a liquid type thermosetting resin such as an epoxy resin. The viscosity of the liquid resin is prepared low. A predetermined amount of the liquid resin is dropped onto the first group 31a from a nozzle 302 of a dispenser 301 located above the stator 3. The stator 3 is rotated during the liquid resin is dropped. After that, the stator core 3 is supported horizontally and is placed in a thermosetting temperature. The liquid resin is soaked and reaches to the inclined portion 33f of the second group 31b through an inside of the slots of the stator core 32 before it is hardened. The process proceeds to the next step after the liquid resin is hardened. The stator core 3 is horizontally supported so that the second group 31b is directed downwardly and is moved downwardly into a tank 303 of the powder resin mainly made of an epoxy resin. The joined portions 33e is submerged into the powder resin only to a base portion of the joined portion 33e. The powder resin is melted and adhered on the joined portions 33e because the stator core 3 is still maintained at the thermosetting temperature for hardening the liquid resin. The tank 303 has an air compressor 304 supplying dried air into the tank and is constructed as a fluidization tank to fluidize the powder resin by dried air supplied from the air compressor. Therefore, it is possible to form the insulating resin 36 having an even thickness and to form the insulating resin 36 stably.

The engine for traveling the vehicle drives the alternator 1 through the pulley 20. Direct current is supplied from a battery to the field coil 8 through the slip rings 9 and 10. The field coil 8 generates N magnetic poles and S magnetic poles on the pole cores 71 and 72. Therefore, the rotor 2 generates a rotating magnetic field across the stator 3. Alternating current is induced in the stator winding 31, and is rectified by the rectifier 5. As a result, direct current is output from the output terminal 6 for supplying to electrical devices mounted on the vehicle.

The cooling fans 11 and 12 are introducing air from axial openings 41 and blowing air toward radial openings 42. Therefore, both of the groups 31a and 31b of the coil ends are cooled.

A bonded construction of the inclined portions 33f by the insulating resin 37 and a ring-shaped construction of the joined portions 33e by the insulating resin 36 suppress a vibration and a short circuit between the joined portions 33e.

In this embodiment, an electrolytic solution, a foreign body and a foreign particle are introduced from the opening 41 on the front side rather than that of the rear side. These foreign matters are slightly small, and are brought toward the second group 31b by the cooling fan 11. The insulating resin 37 prevents that the foreign matters stay and accumulate on an inside of the second group 31b, because the insulating resin 37 covers and fills the second group 31b up with high density. The insulating resin 37 protects the insulating layer primarily covering the conductor. Therefore, an electrical insulation on the second group 31b can be improved. Additionally, the insulating resin 37 provided on the first group 31a is less than that of the second group 31b. Therefore, the first group 31a has a sufficient surface area to radiate heat. Further, the amount of the insulating resin 37 provided on the second group 31b is adjusted and limited to form the grooves 37c on the radial outside of the second group 31b. Therefore, a sufficient surface area to radiate heat is also maintained on the second group 31b.

In the above-described embodiment, two insulating resins 36 and 37 are used, however, a single insulating resin may be used to cover both of the joined portions 33e and the inclined portions 33f. Such a single insulating resin must have a viscosity to cover the joined portions 33e thickly, an infiltrating ability into the space between the inclined portions 33f and a fixing ability between the inclined portions 33f and between the conductors and the stator core 32. In this case, it is possible to improve productivity.

Figure 7:
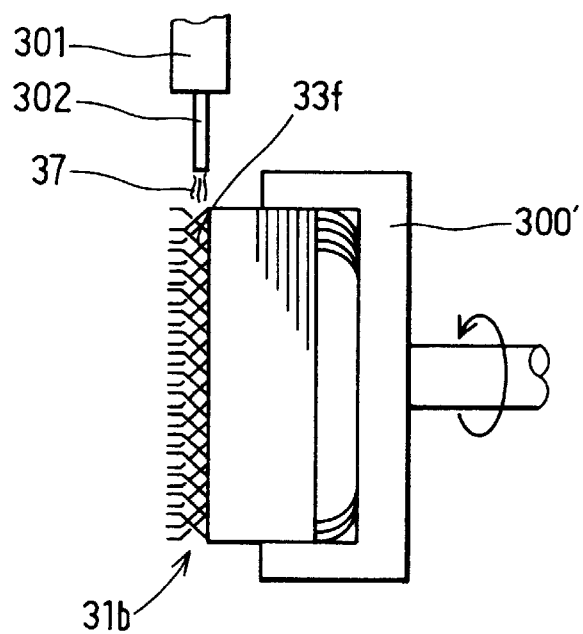
FIG. 7 is a plane view showing a process for providing an insulating resinous material on an inclined portion of the coil end according to a second embodiment of the present invention.

Further, the insulating resin 37 may be only provided on the second group 31b. In this case, the rotating axis of the jig 300' is positioned horizontally as shown in FIG. 7. In a manufacturing process, the insulating resin 37 is dropped from above the second group 31b. The other process is the same as the above-described embodiment.

The insulating resin 36 may be made of a liquid resin. In this case, the liquid resin is pooled in the tank 303 and the second group 31b is submerged a predetermined length into the liquid resin.

In the above-described embodiment, double U-shaped conductor segments 33 are used for providing the winding, however, a single conductor segments can be used for providing a winding. In this case, the single U-shaped conductor segments form two layers of the conductors in each of the groups and in the slots. These arrangements of the conductor segments may be used alternatively.

Further, the present invention may be applied for an air-cooled rotary electric machine for the vehicle and the other various purposes. For instance, the present invention may be applied to a motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A rotary electric machine comprising:
a rotor having a pole core having claw poles and a cooling fan disposed on an axial end of said pole core;
a stator having a stator core and a stator winding positioned on said stator core, said stator winding comprising a plurality of conductor segments providing a portion accommodated in slots of said stator core and a coil end portion extended from said slots, each of said conductor segments having a turn portion, an inclined portion crossing the other conductor segment at said coil end portion and a tip end portion joined to another for providing a joined portion, said coil end portion including a first group in which a plurality of said turn portions are arranged and a second group in which a plurality of said joined portions are arranged;
a frame for supporting said rotor and said stator;
a pulley for rotating said rotor; and
a resin member including a ring-shaped first resin member disposed on said second group for covering said joined portions and a second resin member adhered to a bridge between said inclined portions in said second group.

2. A rotary electric machine according to claim 1, wherein:

said second group is located near said pulley.

3. A rotary electric machine according to claim 1, wherein:

a density of said second resin is higher in a radial inside than in a radial outside of said second group.

4. A rotary electric machine having a stator core and a stator winding formed by joining a plurality of U-shaped conductor segments at ends thereof, comprising:

a first group disposed on a first end of said stator core and having a plurality of turn portions of said U-shaped conductor segments;

a second group disposed on a second end of said stator core and having a plurality of joined portions which is formed by joining said ends of said U-shaped conductor segments; and an insulating resin provided on a surface of said U-shaped conductor segments being thicker in said second group than in said first group.

5. A rotary electric machine according to claim 4, wherein:

said first group provides cooling passages therein, and wherein a second resin fills spaces between said U-shaped conductor segments in said second group.

6. A rotary electric machine according to claim 4, having inclined portions in said first and second groups wherein:

an inclining angle of said inclined portions is smaller in said first group than in said second group.

7. A rotary electric machine having a stator core and a stator winding formed by joining a plurality of U-shaped conductor segments at ends thereof, comprising:

a first group disposed on a first end of said stator core and having a plurality of turn portions of said U-shaped conductor segments;

a second group disposed on a second end of said stator core and having a plurality of joined portions which is formed by joining said ends of said U-shaped conductor segments;

a first insulating resin for covering said joined portions; and a second insulating resin for covering only said U-shaped conductor segment in said second group.

8. A rotary electric machine according to claim 7, wherein:

said first group provides cooling passages therein, and wherein said second resin fills spaces between said U-shaped conductor segments in said second group.

9. A rotary electric machine according to claim 7, having inclined portions in said first and second groups wherein:

an inclining angle of said inclined portions is smaller in said first group than in said second group.

10. A rotary electric machine having a stator core and a stator winding formed by joining a plurality of conductor segments at ends thereof, comprising:

a coil end group formed by said stator winding, said coil end group being extended from an end of said stator core in an axial direction; and an insulating resin provided on said coil end group for providing an inner surface and an outer surface, said inner surface being smoother than said outer surface.

11. A rotary electric machine according to claim 10, wherein:

said coil end group includes a plurality of joined portions formed by joining said conductor segments, and said insulating resin includes a first resin covering only said joined portions and a second resin for covering an entirety of said coil end group.

12. A rotary electric machine according to claim 10, wherein:

said insulating resin forms grooves having radial depth which is deeper on said outer surface than on said inner surface.

* * * * *